(12) United States Patent
Kraft et al.

(10) Patent No.: US 12,172,271 B2
(45) Date of Patent: Dec. 24, 2024

(54) PORTABLE CRIMPING DEVICE FOR JOINING FOUNDATION COMPONENTS

(71) Applicant: Ojjo, Inc., San Rafael, CA (US)

(72) Inventors: Steve Kraft, Albany, CA (US); Oleg Nashelskiy, Silver City, NV (US)

(73) Assignee: Ojjo, Inc., San Rafael, CA (US)

( * ) Notice: Subject to any disclaimer, the term of this patent is extended or adjusted under 35 U.S.C. 154(b) by 129 days.

(21) Appl. No.: 17/871,760

(22) Filed: Jul. 22, 2022

(65) Prior Publication Data

US 2023/0025639 A1      Jan. 26, 2023

Related U.S. Application Data

(60) Provisional application No. 63/224,723, filed on Jul. 22, 2021.

(51) Int. Cl.
B25B 27/02        (2006.01)

(52) U.S. Cl.
CPC ................... B25B 27/02 (2013.01)

(58) Field of Classification Search
CPC ...... B25B 27/02; B25B 27/026; B21D 39/046; B21D 39/048; H01R 43/0427
See application file for complete search history.

(56) References Cited

U.S. PATENT DOCUMENTS

| | | | | |
|---|---|---|---|---|
| 2,968,202 A | * | 1/1961 | Evans | H01R 43/0427 81/301 |
| 3,554,000 A | * | 1/1971 | Schwab | H01R 43/0427 100/231 |
| 6,446,482 B1 | * | 9/2002 | Heskey | H01R 43/0427 72/453.02 |
| 2007/0214859 A1 | * | 9/2007 | Bowles | B21D 39/048 72/412 |

* cited by examiner

*Primary Examiner* — Teresa M Ekiert
(74) *Attorney, Agent, or Firm* — Phillip D. Mancini

(57) ABSTRACT

A portable crimping device and method of making such a crimping device is disclosed. A portable crimper transfers hydraulic forces back into the hydraulic cylinder and not just into a pinned or fixed connection supporting it. To withstand these forces, the cylinder is milled out of a single piece of source metal and the arm that transfers the forces is joined to the cylinder via pair of flanges extending the entire length of the cylinder to distribute them over a wider surface area.

8 Claims, 9 Drawing Sheets

PORTABLE CRIMPING DEVICE FOR JOINING FOUNDATION COMPONENTS

CROSS-REFERENCE TO RELATED APPLICATIONS

This claims priority to U.S. provisional patent application No. 63/224,723 filed on Jul. 22, 2021, titled "PORTABLE CRIMPER FOR JOINING TUBULAR FOUNDATION COMPONENTS AND METHODS OF MAKING SAME", the disclosure of which is hereby incorporated by reference in its entirety.

BACKGROUND

The Applicant of this disclosure has developed a new and improved foundation system for supporting single-axis solar trackers and other structures. Known commercially as EARTH TRUSS, in some instances, this foundation system consists of a pair of angled legs that extend below and above ground and that are joined together at their apex with an adapter to form a unitary, A-frame-shaped truss structure with the ground. Each leg consists of a screw anchor portion driven into the ground by rotary driver, and an upper leg portion that interconnects the screw anchor to the adapter by sleeving over a portion of each. This adapter, referred to by the applicant as a truss cap, has a pair of connecting portions that extend below a planar tracker mounting surface. These connecting portions are received in respective ones of the upper legs. Once the orientation of the truss set, that is, the screw anchors are driven, the truss cap is held in place above the pair driven screw anchors at the proper orientation, and the upper legs are sleeved over each; crimpers attached to the installation and assembly machine are used to crimp the upper legs at each point where they overlap the screw anchor and the connecting portions of the adapter. The crimp joints lock the components together at the correct orientation.

The EARTH TRUSS foundation is installed and assembled with the assistance of a so-called truss driver machine. The truss driver machine is a piece of heavy equipment sitting on a tracked chassis with a large articulating mast. The mast supports a rotary driver and a drilling tool, such as a hydraulic drifter, that move independently along a common track on the mast. The mast is able to move with respect to tracked chassis to enable pairs of adjacent screw anchors to be driven into the ground at consistent orientations at each installation point along the tracker row. After one pair of legs is driven, an operator places the truss cap on a jig or clamp the machine mast while the upper legs are sleeved over connecting portions of the truss cap and over a driving coupler at the upper end of each screw anchor. Hydraulic crimpers attached to either side of the mast are moved into place around the upper leg sections on either side of the truss cap to crimp the portions of each upper leg that overlap the truss cap and the screw anchor, locking the assembly at the correct orientation before the machine is moved to the next foundation location. A detailed description of the truss driver machine has been intentionally omitted here but may be found by way of example in commonly assigned U.S. Pat. No. 11,168,456 hereby incorporated by reference in its entirety.

One advantage of using hydraulic crimpers as opposed rivets, hucks or bolts is that no additional fasteners are needed to assemble the truss components, saving money, and eliminating the need for additional tools. These savings become significant at the scale of solar power plants where millions of fasteners, in some cases costing several dollars apiece, are required. Also, hydraulic crimpers are capable of making crimp connections very quickly, saving cycle time between trusses while taking advantage of the machine's onboard hydraulic system.

One challenge with portable hydraulic crimpers that is unique compared to linear hydraulic actuators used in other applications, is that when performing a crimping operation around a tubular member such as a truss foundation component, the hydraulic actuator's force is translated back into the body of the crimper. If the crimper is putting out tens of thousands of pounds of force, as is necessary to make a strong crimp connection, those forces are translated back into the hydraulic cylinder via the crimper arm and will tend to rip the hydraulic cylinder apart and/or break the connection between the arm and the cylinder. Therefore, various embodiments of the disclosure are directed to a hydraulic crimper and hydraulic cylinder for such a hydraulic crimper that is able to withstand the large eccentric (non-axial) forces generated by a crimping operation such as that performed when assembling the EARTH TRUSS foundation.

DETAILED DESCRIPTION

The following description is intended to convey a thorough understanding of the embodiments described by providing a number of specific embodiments and details involving crimping devices for forming truss-shaped as well as other multi-component foundations used to support single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purpose.

Figure 1:
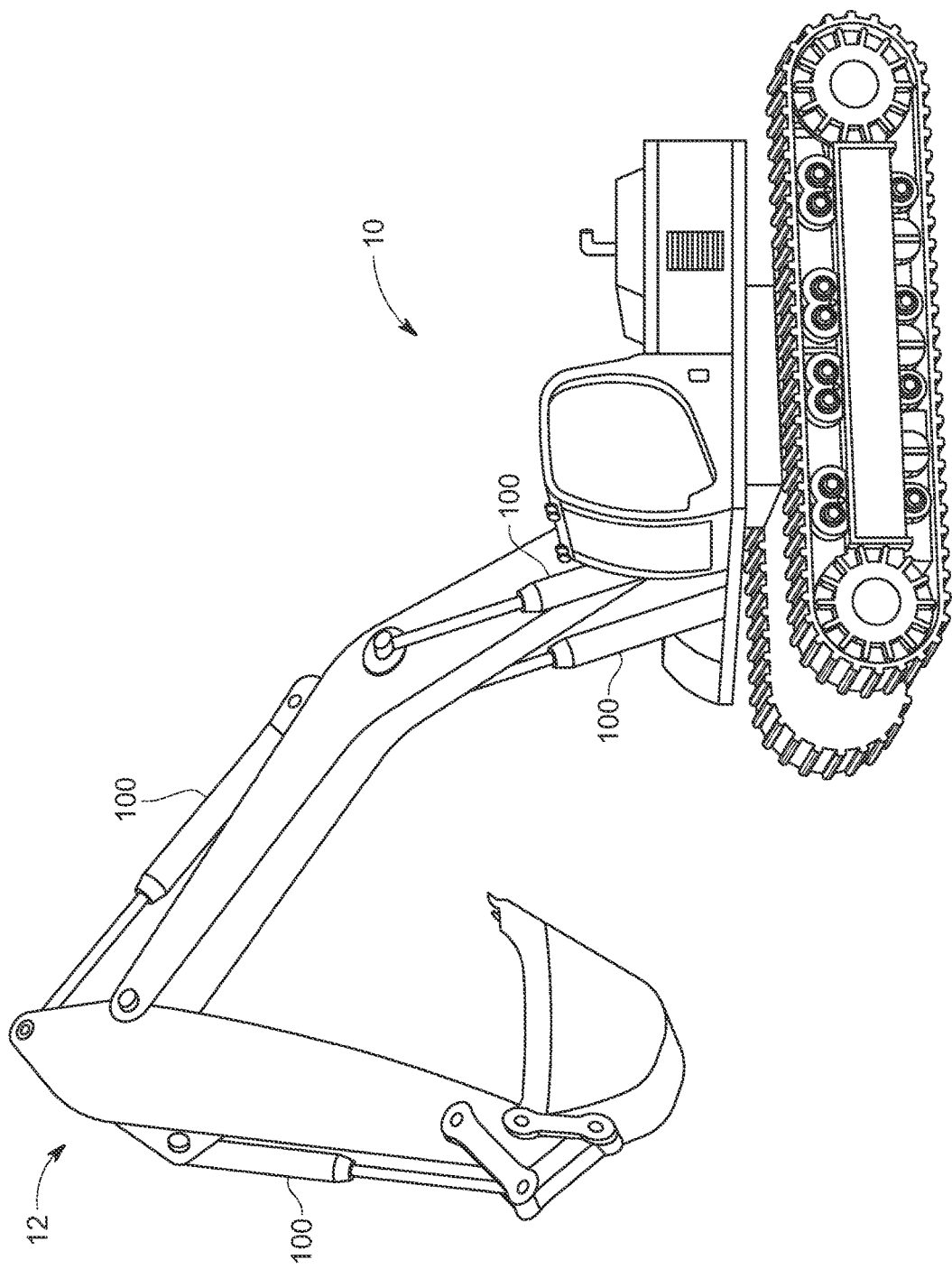
FIG. 1 shows a piece of conventional heavy equipment known commercially as an excavator.

Turning now to the drawing figures, FIG. 1 shows a piece of conventional heavy equipment known as an excavator. Excavator 10 is used primarily as a digging tool but may also accept other attachments including pneumatic hammers, rotary drivers, augers, etc. Attachments such as these are typically attached to the distal end of the excavator arm 12 where the digging bucket sits. Excavator 10 has an on-board diesel engine that powers a hydraulic system; the hydraulic system in turn powers the tracks that move and turn the machine as well as supplying power to the various hydraulic actuators or linear hydraulic motors 100 that enable two-piece arm and bucket or other attachment(s) to move. As actuators 100 extend and contract, they push or pull the portions of the arm they are attached to causing a corresponding motion by the machine. In the case of excavator 10 shown in FIG. 1, four hydraulic actuators 100 are sufficient to move the bucket as well as to lift, lower, extend, and compact two-piece arm 12. When used in this application, actuators 100 are attached at their respective ends to the arm or machine via pinned connections. Pinned connections allow the arm to move with the pushing or pulling force of the actuator but also keep the counter force, that is resistance to the actuator's motion, aligned with the axis of the piston, where the actuator is best able to resist it. This is seen for example in FIGS. 2A and 2B.

Figure 2A:
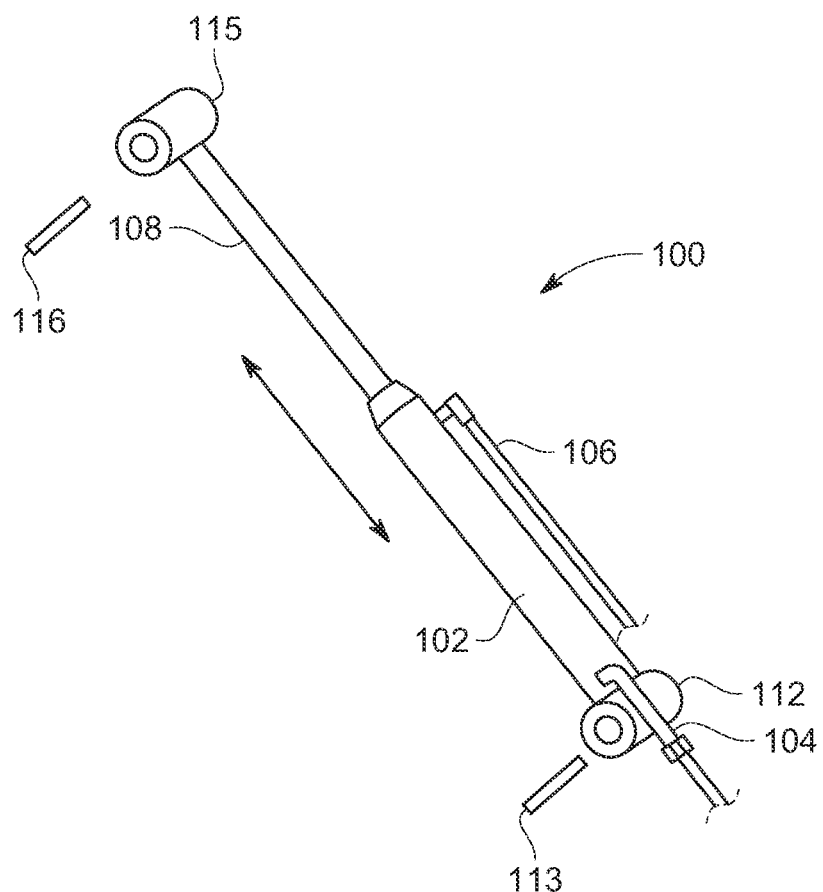
FIG. 2A shows a conventional hydraulic cylinder used on conventional heavy equipment such as that shown in FIG. 1.
Figure 2B:
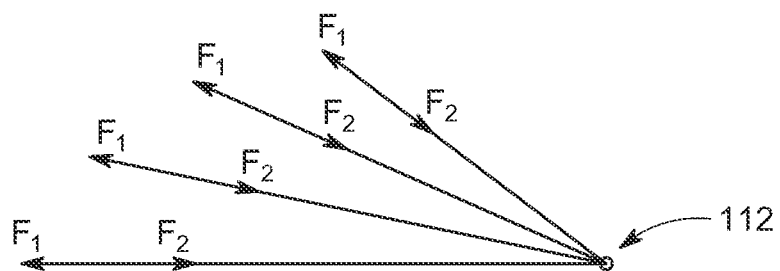
FIG. 2b is a force diagram showing the forces applied by a conventional hydraulic cylinder when pinned at one end to a machine.

Conventional hydraulic actuator 100 shown in FIG. 2A consists of hydraulic cylinder 102 with inlet port 104 and outlet port 106 to allow the inflow and outflow of pressurized hydraulic fluid into and out of the cylinder. Fitting 112 built into the base of cylinder 102 provides a pinned anchor point. Pin 113 secures fitting 112 to the arm of the machine or to its base. Hydraulic piston 108 has an elongated portion that extends out of hydraulic cylinder 102 while internal rubber or silicone seals contain the pressurized fluid. The distal end of piston 108 has fitting 115 that is pinned with pin 116 to the portion of the machine that the actuator controls. Typically, this is the part of the machine that moves when the operator selects the control for that cylinder, causing a corresponding motion of the machine (i.e., extending or retracting the hydraulic arm). In the case of the conventional linear hydraulic actuator, when used in most applications, the pinned connections at one or both ends keeps the majority of the forces in the axial direction, that is, into and out of the cylinder, rather than in bending. For example, as seen in FIG. 2B, as the piston is pushed out with force $F_1$, a corresponding force $F_2$ is experienced at pinned hinge fitting 112 at the base of cylinder 102.

Figure 3:
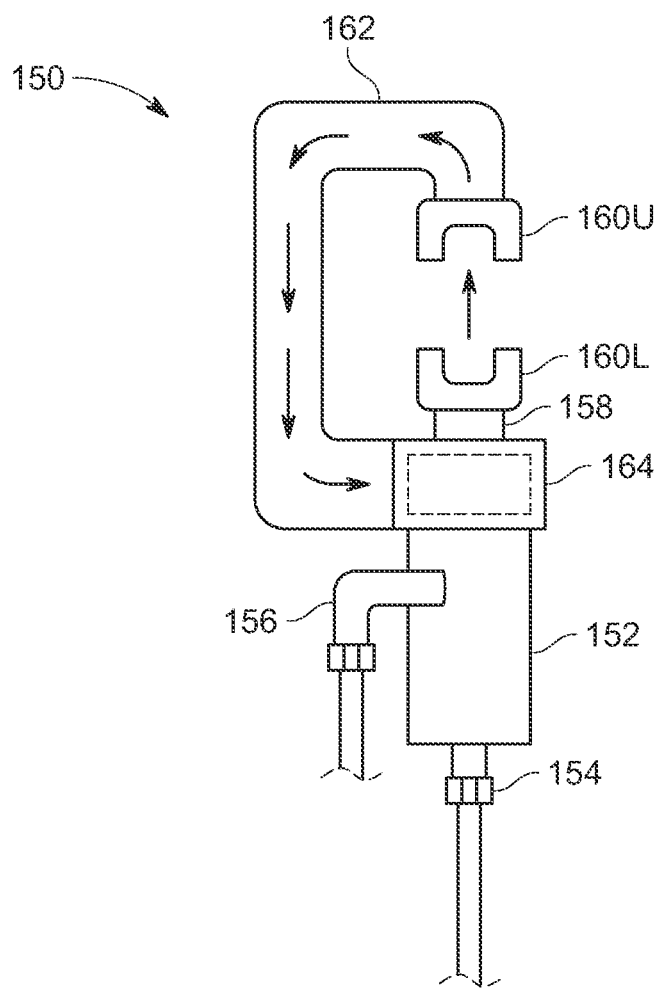
FIG. 3 is a plan view of a conventional hydraulic crimping device used to join foundation components.

As discussed herein, the applicant of this disclosure has developed a novel foundation system for supporting single-axis solar trackers and other structures that relies on crimping to interconnect assembled foundation components. A hydraulic actuator is needed to generate the tens of thousands of pounds of force (e.g., 40,000 lbs) required to deform the steel tubes used in this system sufficiently to form a reliable crimp joint, that is, one that will remain in place while withstanding the forces generated by a 300+ foot long single-axis solar tracker. To that end, FIG. 3 shows a crimper that may be used to connect EARTH TRUSS foundation components using a standard hydraulic cylinder. Crimper 150 of FIG. 3 consists of hydraulic cylinder 152 with inlet and outlet ports 154, 156 respectively, that attaches to collar portion 164 of crimp arm 162. In some cases, it may thread into collar portion 164 via threads on the outer surface of the cylinder, whereas in others, one or more bolts or other fasteners may be used to hold it in place. When pressurized fluid enters cylinder 152, piston 158 extends moving lower jaw 160L towards upper jaw 160U, that is, narrowing the gap between them. When lower jaw 160L and upper jaw 160U are wrapped around a hollow foundation component, the motion of piston 158 and lower jaw 160L towards upper jaw 160U compresses the foundation component deforming it where the teeth of jaws 160U/L contact its surface. However, unlike conventional actuator 100 used in the excavator of FIG. 1 or shown in FIG. 2A, the output force of cylinder 152 is routed back to itself in an eccentric manner, that is not along the axis of the piston. The force of cylinder 152 is transferred into the upper jaw 160U that is fixed to arm 162, and therefore is directed back to collar portion 164, and ultimately to cylinder 152. The conventional cylinder is not able to resist this eccentric force. The applicant disclosure designed and tested a crimper such as that shown in FIG. 3 and numerous failure modes were observed including at the interface between the arm and the cylinder and in the wall of the cylinder itself.

Figure 4A:
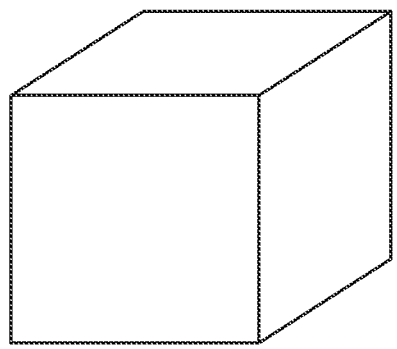
FIGS. 4A-4D show the stages of forming a hydraulic cylinder for a hydraulic crimping device in accordance with various embodiments of the disclosure.
Figure 4B:
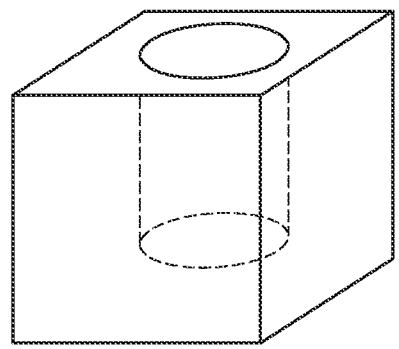
Figures 4C, 4D:
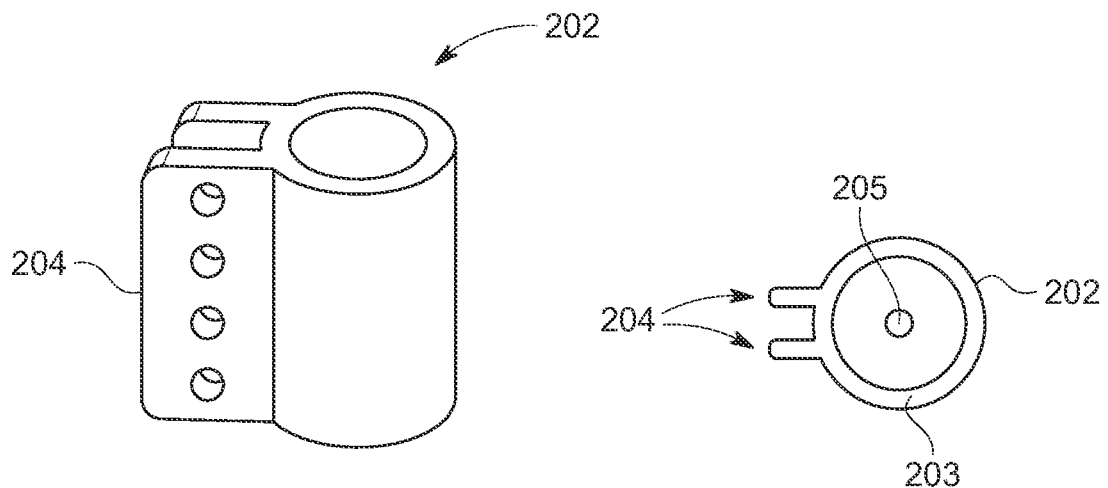

In order to solve this unique hydraulics problem of resisting eccentric forces generated by a cylinder's own output, the inventors of this disclosure developed a crimping device having a hydraulic cylinder bored out of a single piece of source metal and a crimper arm that distributes forces along a larger area of the cylinder. A conventional hydraulic cylinder starts out as a section of steel tube that is cut to length and additional features are welded on or cut or drilled out of the length of tube. Making the cylinder out of a single block of source material eliminates weld joints as well as enabling the cylinder walls to be controlled to be thicker than what is possible with commercially available cylinders not designed to withstand eccentric forces. The formation of such a cylinder is seen, for example, in FIGS. 4A-4E. Starting with FIG. 4A, the process of formation begins with a block of source metal (e.g., steel) having dimensions exceeding the outside dimensions of the final product. Then, as shown in FIG. 4B, material is removed from the block to form a hollowed, cylindrical opening using a multi-axis milling machine. A threaded inlet port 205 extending through the block may be formed in the bottom of the opening to accept a hydraulic valve. Then, as shown in 4C, material is milled away from the outside until hollowed cylinder 202 with sufficiently thick walls 203 remains and a pair of thick, parallel flanges 204 extending the entire length, or in this case depth, of the cylinder are formed. This is shown in more clearly in FIG. 4D which, is an overhead view looking down into cylinder 202. In addition, threads may be formed proximate to the upper cylinder opening (end opposite to opening 205) to enable a gland nut or other cylinder cap to be threaded in place to close the cylinder and enable movement of the piston.

Figure 4E:
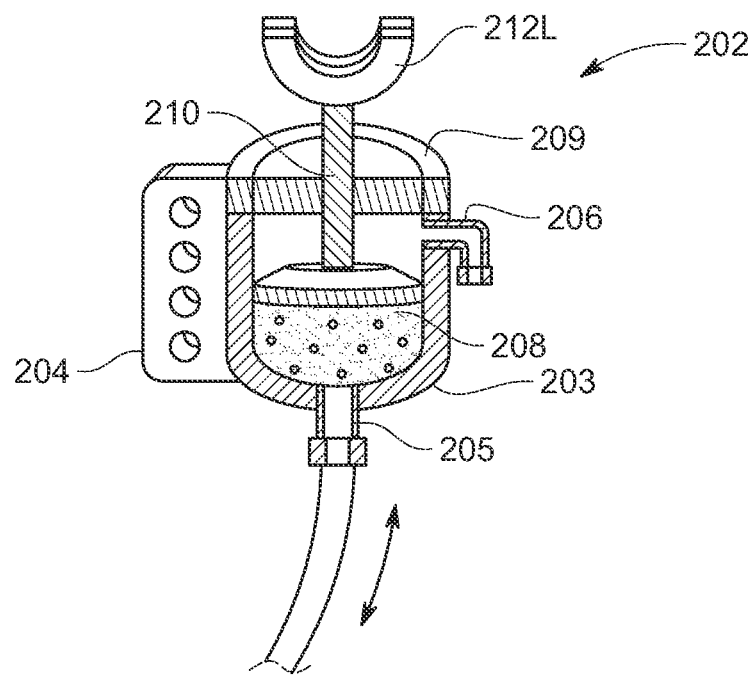
FIG. 4E is a cross sectional view of a hydraulic crimping device according to various embodiments of the disclosure.

Turning to FIG. 4E, this figure shows a partial cutaway view of cylinder 202 according to various embodiments. During use, pressurized hydraulic fluid 208 pushes piston 210 out of cylinder 202 moving lower jaw 212L attached to its distal end. One or more threaded entry ports such as port 206 may also be machined in the upper wall of the cylinder to enable fluid on the top side of the piston to exist the cylinder as pressurized fluid enters behind it.

Figure 5A:
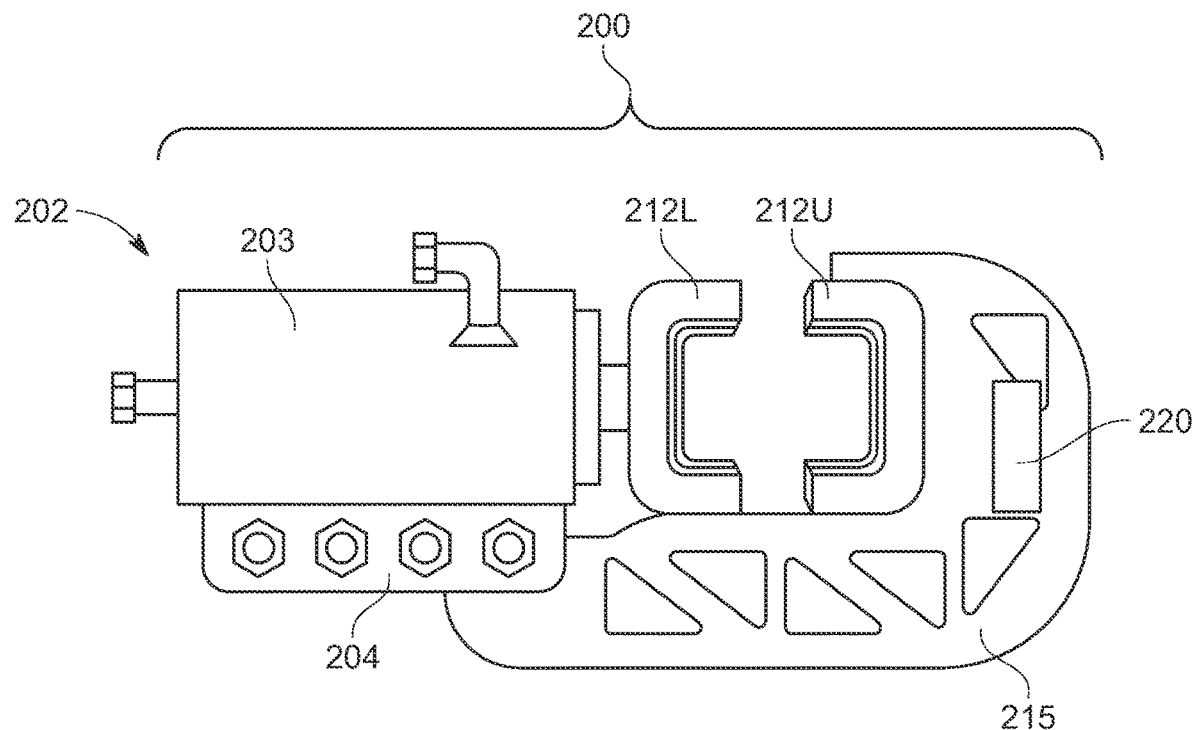
FIGS. 5A and 5B are plan and side view respectively of a hydraulic crimping device according to various embodiments of the disclosure.
Figure 5B:
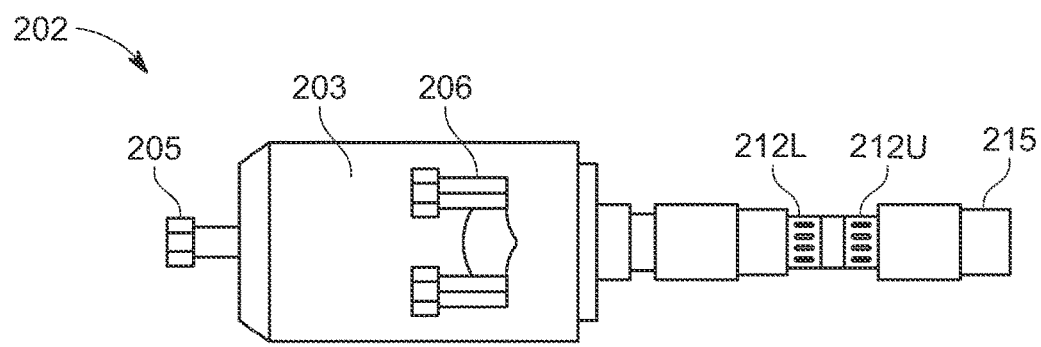
Figure 5C:
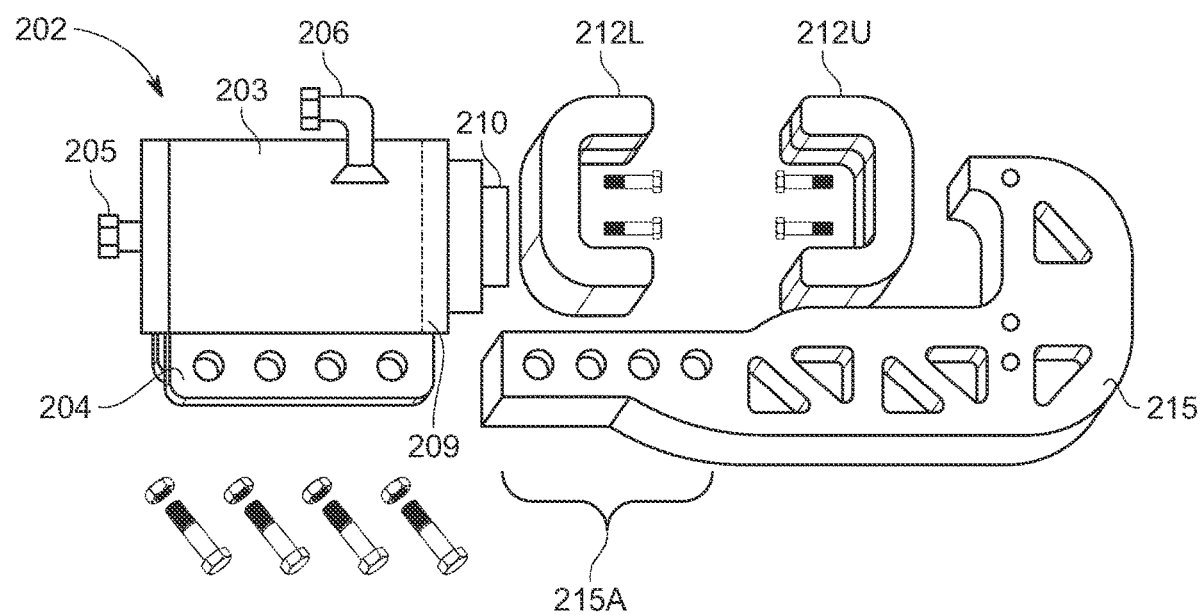
FIG. 5C is a partially exploded plan view of a hydraulic crimping device according to various embodiments of the disclosure.

Crimper 200 incorporating cylinder 202 according to various embodiments of the disclosure and is shown in FIGS. 5A, 5B and 5C. As shown, crimper arm portion 215 extends the entire length of cylinder 202, fitting between flanges 204 formed in outside surface of cylinder 202. Overlapping through-holes formed in flange portion 215A of arm 215 and cylinder flanges 204 enable heavy duty bolts or other fasteners to extend between both components, locking them together into a unitary structure. Lower and upper crimper jaws 212L and 212U are attached to the distal end of piston 210 and crimper arm 215, respectively, via recessed screws, bolts, or other fasteners to enable them to be easily removed for replacement and to prevent damage during crimping. Although the output force of cylinder 202 is still translated back to itself via arm 215, the beefier and longer connection between flange portion 215A of arm 215 and flanges 204, as well as the increased wall thickness and unitary construction of cylinder 202 enable it to withstand these forces without damaging the cylinder. In fact, this particular design has been tested for more than 250,000 crimping cycles with no apparent failures.

FIG. 5C shows the components of crimper 200 in partially exploded plan view. Flange portion 215A of heavy-duty crimp arm 215 fits between parallel flanges 204 formed on the outer surface of cylinder 202 until the holes formed in each overlap. Then, bolts or other fasteners are extended through both flange portions 215A of the arm and flanges 204 of the cylinder and torqued in place to lock the cylinder and arm together. Lower jaws 212L are screwed into threaded openings in top of piston 210 while upper jaws 212U are screwed into threaded openings in arm 215. In various embodiments, the upper and lower jaws may be identical for ease of manufacturing among other reasons. Alternatively, they may differ. Inlet and outlet valves 205/206 allow for the ingress and egress of pressurized hydraulic fluid respectively. Actuators work by injecting pressured fluid into the cylinder. As the cylinder moves, fluid on the other side of the piston is ejected. When assembled, these components may weigh 100 pounds or more. Therefore, in various embodiments they may be attached to the driving and assembly machine via one or more cabled retractors that counterbalance the weight of the crimper, lightening the apparent weight for the operator to something more manageable (e.g., <10-15 lbs).

Although made of hardened materials, crimper jaws 212L/U are intended to be consumable items. In addition, hydraulic cylinder 202 may need to may be rebuilt as is typically done by replacing the seals and valves. In various embodiments, this may be accomplished by unscrewing top portion 209 from walls 203 of cylinder 202. As discussed in the context of FIGS. 4A-E, in various embodiments, when cylinder 202 is formed, a set of machine threads may be formed circumscribing the inner surface of the cylinder proximate to the opening to enable top portion 209 to be screwed in using a gland nut wrench, spanner wrench or other suitable tool. Valves 205 and 206 may simply be unscrewed from their respective threaded openings in cylinder 202 for removal. Extending the life of the hydraulic cylinder and essentially eliminating cylinder failure due to eccentric forces substantially reduces the operating costs of the hydraulic crimper.

Figure 6A:
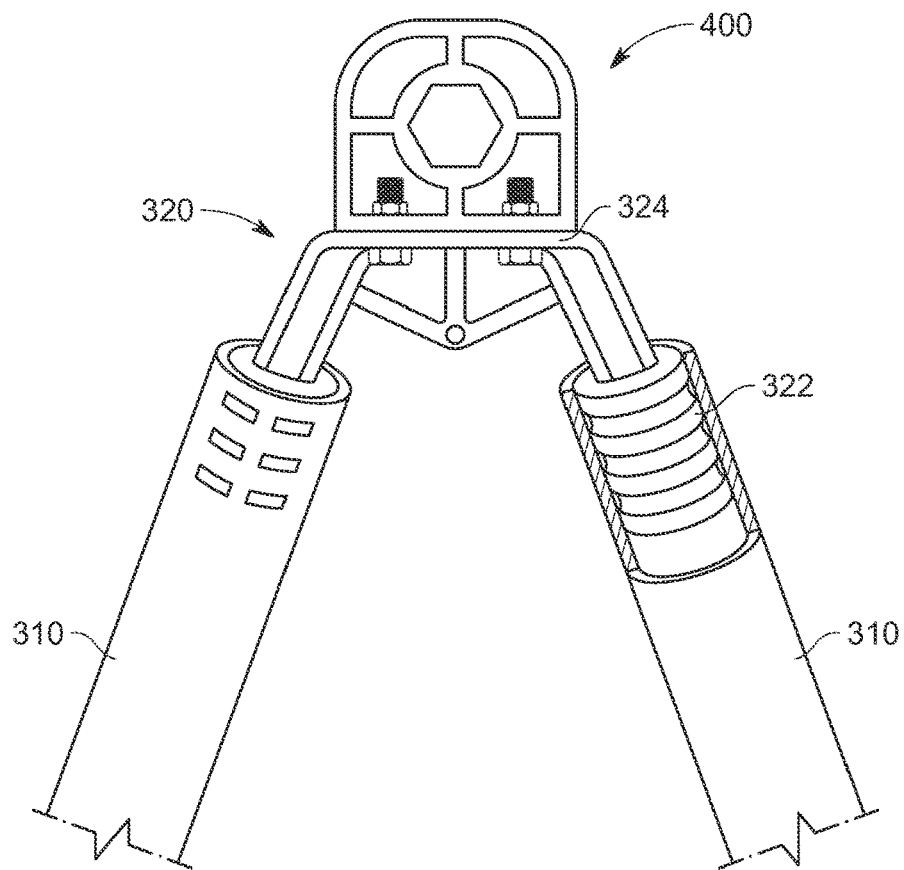
FIG. 6A is a partial cut-away view of a truss foundation formed with a hydraulic crimping device according to various embodiments of the disclosure.
Figure 6B:
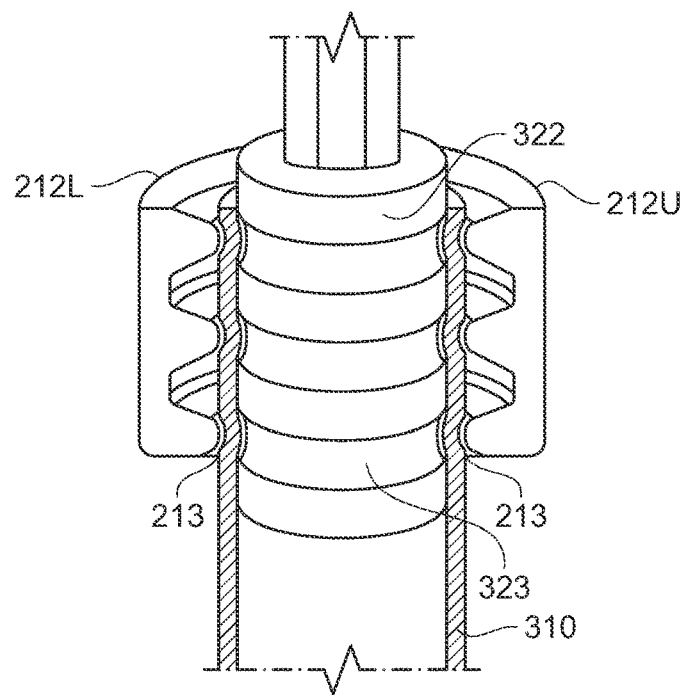
FIG. 6B is a close-up cut-away view of the jaws of a crimping device according to various embodiments of the disclosure engaged in a crimping operation of an upper leg component to a truss cap component of a truss foundation.

The remaining figures, 6A, 6B, 7A and 7B, show crimp joints between foundation components that have been formed with the crimper according to various embodiments of the disclosure. FIGS. 6A and 6B show a portion of a truss foundation formed using a crimper such as crimper 200. The foundation here is characteristic of at least one embodiment of the EARTH TRUSS foundation and is shown supporting a tracker component from tracker-maker Array Technologies, Inc. of Albuquerque, NM. These figures showing the top portion of the truss only including upper leg portions 310 and adapter or truss cap 320. As described herein, truss cap 320 has a pair of connecting portions 322 that extend downward and that are each received in one of upper leg portions 310. Top mounting surface 324 supports tracker bearing assembly 400, which in turn, receives the torque tube and allows it to rotate. During installation and assembly, after a pair of adjacent screw anchors have been driven into the ground, the machine mast reverts to an alignment orientation so that the truss cap may be attached to a jig, holder, or clamp on the mast. In some cases, the machine may revert back to the orientation that was initially calibrated prior to installation. Alternatively, it may go to a different orientation to provide sufficient clearance to attach the legs before being moved so that the truss cap is held at the proper orientation relative to other truss caps in the same row to maintain a consistent position relative to the torque tube. Upper leg sections 310 are sleeved over connecting portions 322 and down onto driving couplers 306 at the top of the driven screw anchors, as shown, for example, in FIGS. 7A and 7B. With the truss cap's position locked at the correct orientation, a hydraulic crimper such as crimper 200 in FIGS. 5A and B, may be pulled down from each side of the mast by an operator and placed around one of the upper legs.

In some embodiments, the crimper may have an upper crimp guide that attaches to some point on the truss cap so that the jaws of the crimper will be a predictable distance from the connecting portions and the teeth will precisely line up over the channels formed in connecting portion 322 to insure a maximally effective crimp joint. FIG. 6B shows the teeth 213 of lower and upper jaws 212L/212U directly over channels 323 in connecting portion 322 of truss cap 320. When the crimper is actuated, the piston 210 moves lower jaw 212L toward upper jaw 212U, deforming upper leg section 310 into channels 323 to form a 3-row crimp joint as seen in 6A. At the same time, or nearly the same time, another operator may perform the same step on the second connecting portion 322 to lock the adjacent upper leg 310 to the truss cap.

Figure 7A:
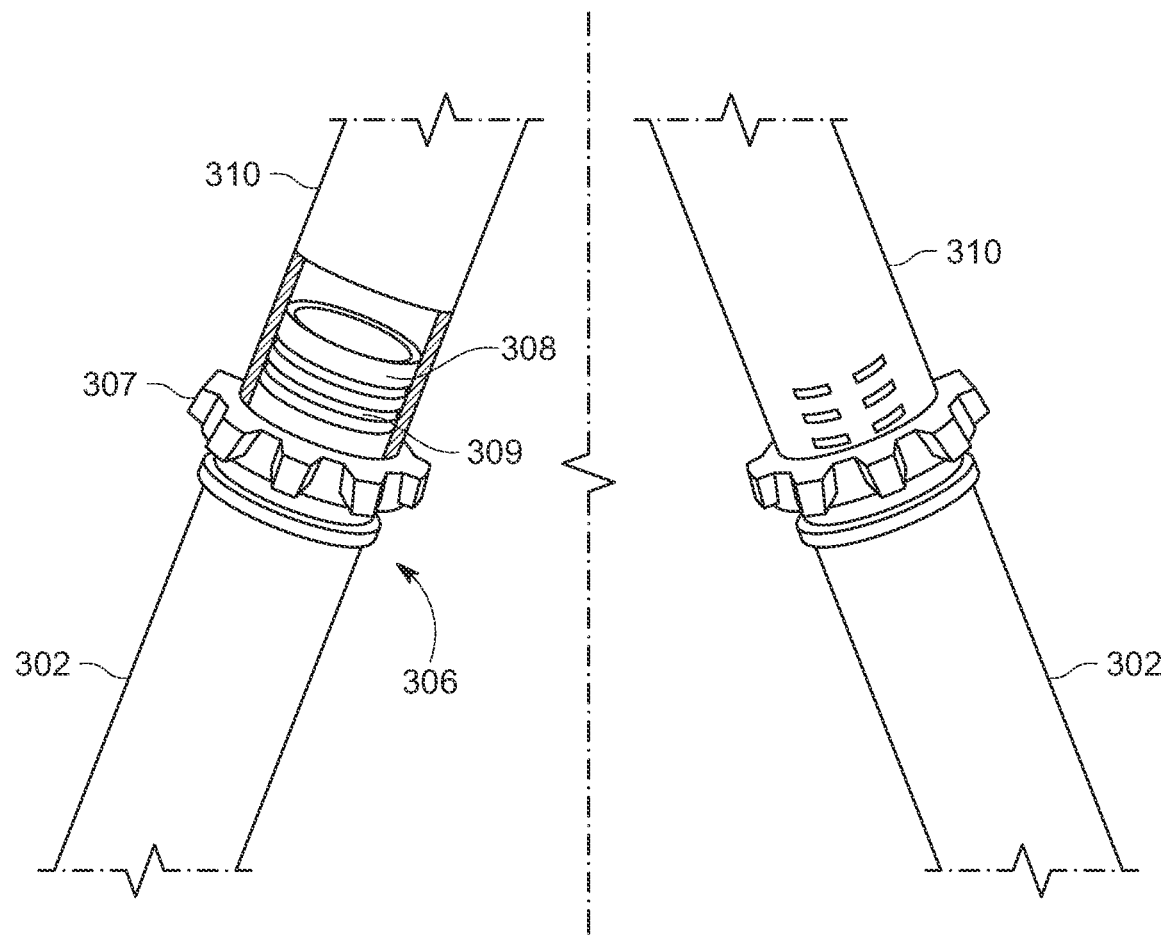
FIG. 7A is a partial cutaway of a crimped leg connection of a truss foundation according to various embodiments of the disclosure.
Figure 7B:
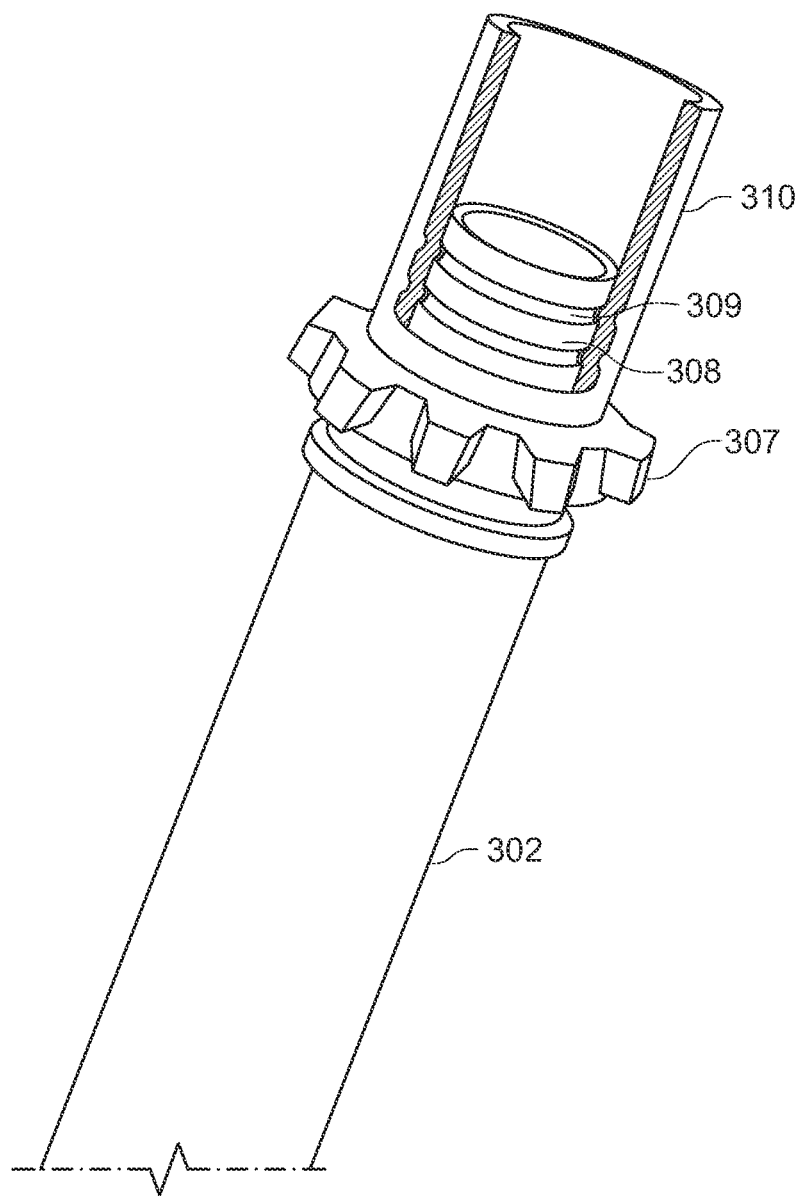
FIG. 7B is a close-up cut-away view of a crimp connection between an upper leg and driving coupler according to various embodiments of the disclosure.

FIGS. 7A and 7B show the lower crimp joint of an exemplary EARTH TRUSS foundation, where upper leg 310 is sleeved over driving coupler 306 of screw anchor 302. Driving coupler 306 has a ring of driving teeth 307 and a connecting portion 308 with recesses 309 circumscribing its surface, similar to connecting portion 322 of truss cap 320. Driving teeth 307 are engaged by the truss driver installation and assembly machine's rotary driver and also serve as a stop to limit the depth of penetration of the screw anchor 302 into upper leg 310. The same crimpers used to effect the upper crimp joints are simply moved down to the intersection of upper leg 310 and coupler 306 resting against ring 307. Ring 307 also serves as a connection point for a lower crimp guide attached to each crimper so that when the crimper is engaged, the teeth of the lower and upper jaws 312U/312L are positioned directly over recesses 309.

It should be appreciated that although a particular truss foundation is shown in the various figures, the crimper and techniques and methods shown and discussed herein are equally applicable to joining other foundation components regardless of whether they're configured as a truss, as parallel plumb piles, or even as mono piles. Moreover, The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A hydraulic crimping device for joining foundation components comprising:
   a cylindrical base portion containing a piston extendable out of a top end of the cylindrical base portion and having a pair of first flanges on an outer surface of the cylindrical base portion running substantially its entire length;
   an arm having a second flange at one distal end that is received between the pair of first flanges;
   a plurality of fasteners extending through respective overlapping holes in the pair of first flanges and the second flange; and
   a pair of opposing crimp jaws, a one of the pair attached to the piston of the base portion and a second one attached to the arm, for forming at least one deformation around a tubular member when the piston is actuated to move the first one of the jaws towards the second one.

2. The hydraulic crimping device according to claim 1, wherein the cylindrical base portion is formed from a single block of source material with a threaded opening formed at the top end, and the piston is extendable through a cylinder cap screwed into the threaded opening.

3. The hydraulic crimping device according to claim 2, wherein the pair of first flanges is formed from a destructive process on the single block of source material.

4. The hydraulic crimping device according to claim 1, further comprising a first hydraulic fitting extending out of a bottom end of the cylindrical base portion for communicating hydraulic fluid into and the cylindrical base portion, and a second hydraulic fitting proximate to the threaded opening for communicating hydraulic fluid out of the cylindrical base portion.

5. The hydraulic crimping device according to claim 1, further comprising at least one crimp guide attached to the arm, the crimp guide enabling the crimp jaws to form the at least one deformation around a tubular member at a fixed distance from the at least one crimp guide.

6. A portable hydraulic crimper for joining tubular foundation components comprising:
   an arm;
   a piston;
   a pair of opposing crimp jaws, one positioned at a distal end of the arm and the other at a distal end of the piston; and
   a hydraulic cylinder formed by the method comprising:
      processing a single block of source metal to form a hollowed cylindrical cavity that is open at one end;
      forming threads proximate to the one end;
      removing material on an external surface of the block of source metal leaving a cylinder with a pair of first parallel flanges running substantially the entire length of the cylinder on its external surface;
      sealing the cylinder with a cylinder cap via the threads, the cylinder cap enabling the piston to extend out of the cylinder under hydraulic pressure;
      forming a first threaded hole in a bottom of the cylinder;
      screwing a first valve into the first threaded hole, the first valve communicating hydraulic fluid to the cylinder to actuate the piston;
      forming a second threaded hole proximate to a top of the cylinder; and
      screwing a second valve into the second threaded hole, the second valve communicating hydraulic fluid out of the cylinder when the piston is actuated.

7. The portable hydraulic crimper according to claim 6, wherein the arm comprises a second flange that is seated between the pair of first parallel flanges.

8. The portable hydraulic crimper according to claim 7, further comprising a plurality of fasteners passing through overlapping openings in the pair of first parallel flanges and the second flange.

* * * * *